(12) United States Patent
Weinberg (10) Patent No.: US 6,219,385 B1
(45) Date of Patent: Apr. 17, 2001

(54) DIGITAL AM/FM POSITIONING SYSTEM (DAFPS)—AN INTERNATIONAL POSITIONING SYSTEM

(75) Inventor: Aaron Weinberg, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/468,856

(22) Filed: Dec. 21, 1999

Related U.S. Application Data (60) Provisional application No. 60/113,836, filed on Dec. 23, 1998.

(51) Int. Cl.[7] .................................................. H04L 25/00
(52) U.S. Cl. .......................... 375/259; 455/456; 342/463; 701/213
(58) Field of Search ................................... 375/130, 259; 455/456, 553; 342/450, 463, 464, 465; 701/213

(56) References Cited

U.S. PATENT DOCUMENTS

| | | | |
|---|---|---|---|
| 5,365,450 | 11/1994 | Schuchman et al. | 364/449 |
| 5,422,813 | 6/1995 | Schuchman et al. | 364/449 |
| 5,623,494 * | 4/1997 | Rostoker et al. | 370/397 |
| 5,668,749 * | 9/1997 | Corleto et al. | 708/490 |

* cited by examiner

*Primary Examiner*—Don Vo
(74) *Attorney, Agent, or Firm*—Jim Zegeer (57) ABSTRACT

A digital positioning system using digital AM and FM radio stations for use in the environment of a plurality of digital AM and FM (AM/FM) radio stations which comprises a customer service center and a reference station which regularly and passively receives signals from all local digital AM/FM stations and measures variations in key parameters of frequency and wavelength thereof and provides AM/FM correctional data signals corresponding to each AM/FM station frequency and wavelength variation to the customer service center. The customer service center is adapted to provide the AM/FM correctional data signals to each of the digital AM/FM radio stations for insertion into ancillary digital data broadcast from each digital AM/FM radio station. A plurality of mobile receivers in the environment of AM/FM radio stations, each of the mobile receivers receiving and processing three or more digital AM and/or FM signals and estimating and updating its position at periodic intervals and sending the results thereof to the customer service center via cellular or other network.

7 Claims, 7 Drawing Sheets

DIGITAL AM/FM POSITIONING SYSTEM (DAFPS)— AN INTERNATIONAL POSITIONING SYSTEM

REFERENCE TO RELATED APPLICATION

This application is the subject of provisional application Ser. No. 60/113,836 filed Dec. 23, 1998 and entitled "Digital AM/FM Positioning System (DAFPS)—An International Positioning System."

BACKGROUND OF THE INVENTION

Recent years have witnessed ever-increasing interest in radio positioning and navigation systems, with interest spanning a very broad range of government and commercial applications. Probably the best known, and most applied system to date is the U.S. Government Global Positioning System (GPS), which relies on many simultaneous, and globally distributed satellite broadcasts. All satellite transmissions rely on highly stable, and mutually synchronized clocks, and apply well-established spread-spectrum signaling techniques. In the absence of blockage (e.g., from buildings in urban areas) or multipath, suitable equipped radio receivers can provide highly accurate position (e.g., 100 meter to even centimeter accuracy). GPS performance, however, degrades rapidly when blockage and/or multipath is present, thereby dramatically reducing its effectiveness for a broad range of personal services in urban and suburban areas—including traveler services and FCC-mandated, wireless 911.

In recognition of the importance of enabling positioning in urban/suburban regions, considerable effort has been expended in recent years in defining and developing terrestrial-based approaches that can overcome or mitigate propagation phenomena in such difficult regions. These include: passive or active positioning via the evolving digital cellular and PCS networks; positioning via existing terrestrial AM radio transmission; positioning via existing FM radio transmission; positioning via existing TV transmissions; hybrids of GPS and terrestrial signaling. Each of these approaches offers benefits but also limitations. For example, the IS-95 spread-spectrum signal is ideally suited for ranging and positioning, but the power control inherent in the system limits the ability to simultaneously receive from multiple, geographically distributed cell-sites/base stations; multipath degradation is also a factor if very accurate positioning is desired. On the other hand, FM and TV transmissions offer very high power, but multipath, range resolution and/or geometry may limit positioning accuracy. Tracking of AM carriers offer extremely attractive resolution, and the long wavelength of AM makes it fairly immune to multipath, but AM is very sensitive to burst noise and nighttime propagation phenomena. In addition, several of these approaches require additional terrestrial infrastructure and interfaces to enable calibration of inherent error sources (e.g., oscillator clock biases).

What is clearly needed is a system approach and implementation that simultaneously draws upon the strengths of several of the above, and does so in a manner that simultaneously mitigates inherent weaknesses of any one of the approaches. In other words, two or more approaches are applied in a complementary fashion, and leverages inherent capabilities not exploited to date. Furthermore, the system approach must minimize infrastructure/interface augmentation.

The GPS system is an example of prior art in regards to positioning systems. It is a spread spectrum system where each satellite transmits a unique Pseudo Noise (PN) sequence. A GPS receiver correlates to these different PN sequences generating an impulse signal that mark the arrival time from each satellite signal. The time differences between these signals are then used to calculate a position. To maximize position accuracy, these PN Sequences are selected for their good auto-correlation properties (i.e., close to impulse). It can be shown that an OFDM symbol also has an excellent auto-correlation properties, and can be used in a similar but unique way.

It is easiest to understand the OFDM's excellent auto-correlation property by examining the signal in the frequency domain. An OFDM symbol is typically constructed by placing a symbol in each carrier (i.e., frequency bins), performing an Inverse Fast Fourier Transforms (IFFT), and transmitting the time domain signal. Assuming PSK modulation, the OFDM symbols have a constant magnitude across its bandwidth and "information" on the phases on each carrier. If the phase "information" is removed, then the resulting signal has a constant magnitude and phase. This resulting signal is the frequency response of a discrete impulse. Note that removal of phase information can be performed by bin-wise multiple across the OFDM symbol with a complex conjugate of itself. This operation is the equivalent to a circular auto-correlation in the time domain.

It should be noted that most OFDM systems have a guard interval after (and/or before) each OFDM symbol and that this guard interval contains a repeated portion (i.e., circular shift) of the OFDM symbols. This makes the system more tolerant to intersymbol caused by timing offset or multipath. It also is beneficial to positioning techniques using the circular correlation operation.

OVERVIEW OF THE INVENTION

The object of this invention is to provide a terrestrial navigation system, characterized by the following general features.

1. A distributed population of vehicles or people that are either stationary or mobile—i.e., a population of mutually independent "users".

2. The users may be indoors or outdoors.

3. User navigation must be passive—i.e., the user performs navigation via passive reception of radio signals that are always present.

4. The navigation capability is embedded in a host device that can also be used to actively or automatically transmit the user's position at periodic intervals (e.g., every 5 seconds). The host device can, for example, be a cellular or PCS phone.

5. Applications of interest include, but are not necessarily limited to: E911; traveler services (e.g., vehicle routing); surveying.

6. The navigation system should be capable of operating without GPS, although augmentation with GPS is certainly permissible.

Toward this end, a novel concept and functional implementation is disclosed that uniquely and efficiently applies the signals transmitted by planned Digital-AM and Digital-FM terrestrial radio stations to position determination and relevant services, such as E911 and traveler information. The concept presented in this invention is an extension of Schuchman et al U.S. Pat. Nos. 5,422,813 and 5,365,450 incorporated herein by reference, on a system concept to passively monitor and track the carriers of local AM and FM radio stations. The enhanced system presented herein can operate totally independently of GPS, and is termed Digital AM/FM Positioning System (DAFPS). The present DAFPS leverages current activities to transition the AM and FM broadcast stations to all-digital broadcasts, following a multi-year transition period wherein analog and digital will coexist. The unique features of this invention include the following:

1. National (and potentially an international) system; this reflects the expected standardization of the Digital AM and FM signals.

2. Passive reception and processing of Digital AM and FM radio signals, without any interaction or coordination with the AM and FM systems.

3. Availability of a multitude of AM and FM signals in a single user/customer radio receiver that is (or may be) an augmentation of standard Digital AM/FM radio; the associated quantity and geometrical distribution of the AM and FM transmitters directly leads to robust and accurate position determination.

4. Within the urban canyon environment, the propagation characteristics of AM and FM signals complement each other, by providing robustness and diversity; i.e., AM signal propagation reflects a degree of robustness against multipath, relative to FM radio signals, due to the long wavelength of AM signals, while FM offers robustness in certain indoor environments, as well as during nighttime and thunderstorms (i.e., impulsive noise).

5. Radio receiver signal processing uniquely takes advantage of the Orthogonal Frequency Division Multiplex (OFDM) signal structure, used for the Digital AM/FM transmissions. The multi-coherent-carrier nature of OFDM directly permits implementation of tone ranging, with inherent ambiguity resolution, while the desired high resolution is obtained via direct tracking of the AM carriers; achievable position accuracy ~30 m (3σ), which reflects the tracking of the AM carrier to a small fraction of wavelength (the AM wavelength ranges from ~600' to 2000').

6. Each urban canyon area of interest may contain a low-cost reference station that measurers "AM and FM relative phase/frequency corrections" and provides them to the user/customer terminal via embedded, ancillary digital data nominally broadcast by the radio stations. Alternatively, local reference stations can be avoided if each radio station is augmented with a self-contained, non-interfering module that automatically determines appropriate "correction data" and feeds the result into the local station's ancillary data.

7. An alternative to tone ranging is to perform correlation operation of the received OFDM signal. In this method the receiver signal processing:

a. Receives an OFDM signal and transform to the frequency domain,    b. Detects the symbol on each carrier,    c. Removes the data using a circular correlation operation (in the Frequency Domain). Then the resulting signal is a good estimate of the Channel Impulse Response (CIR). In other words, a OFDM symbol can be collapsed to an impulse similar to a PN Sequence using a correlation operation.

DESCRIPTION OF THE DRAWINGS

The above and other objects, advantages and features of the invention will become more clear when considered with the following specification and accompanying drawings, wherein:

FIGS. 5A and 5B illustrate radio transmitter options; FIG. 5A illustrating the situation where the transmitter has an external reference station and FIG. 5B a transmitter with no external reference station, FIG. 6 diagrammatically illustrates the tone ranging process.

OVERVIEW OF DIGITAL AM, FM RADIO AND ITS APPLICABILITY TO TERRESTRIAL RANGING

An emerging concept for terrestrial, digital radio involves employing the well known Orthogonal Frequency Division Multiplex (OFDM) signaling technique, and distinctly tailoring it to AM and FM bandwidths. Specific goals include:

1. Enabling high quality (e.g., CD quality) AM and FM broadcasts via digital signaling and coding.

2. Enabling analog and digital broadcasts to coexist in existing frequency band allocations, thereby permitting a smooth transition over multi-year period.

3. Enabling additional, ancillary digital data (e.g., weather, stock quotes) to be simultaneously broadcast, via appropriate utilization of the available OFDM carriers.

Figure 1:
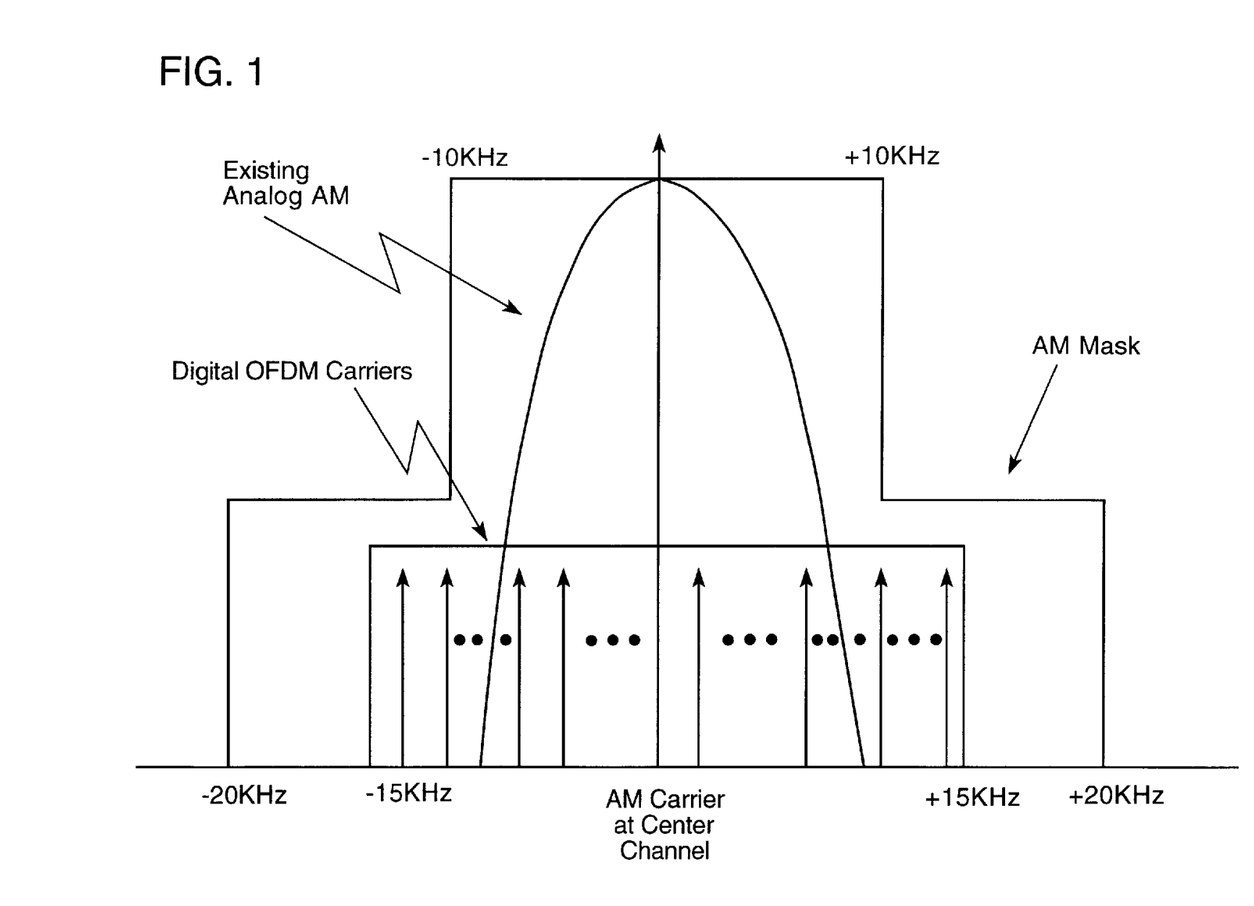
FIG. 1 is a graph showing Digital AM overlay on existing AM.
Figure 2:
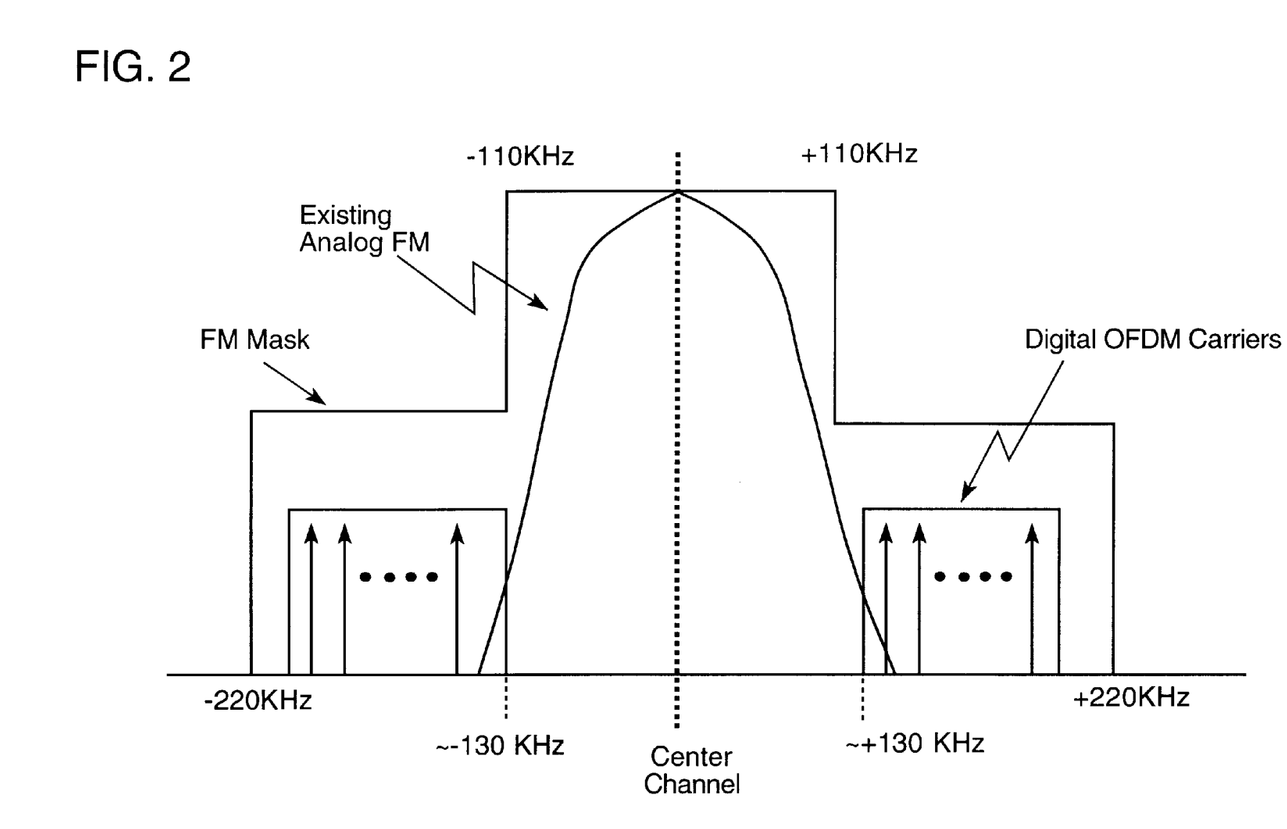
FIG. 2 is a graph showing Digital FM overlay on existing FM.

Representative spectral characterization of the AM and FM bands are shown in FIGS. 1 and 2. The following observations apply:

1. In both FIGS. 1 and 2, the digital AM and FM carriers coexist with their existing analog counterparts in the existing, allocated band.

2. For the AM case, in FIG. 1, the OFDM carriers (e.g., 50 or more) are seen to occupy a bandwidth of ~30 kHz, with a portion of the digital signal "underneath" the existing analog AM signal. To preclude mutual interference, the OFDM power levels have to be carefully selected, and the proper amount of digital coding/interleaving have to be used. Note that once the "transition period" ends, the full band will be occupied by only the OFDM digital carriers.

3. For the FM case, in FIG. 2, the OFDM carriers (e.g., potentially 100 or more) are once again seen to coexist with the existing analog FM, but here the larger available bandwidth enables the OFDM portion to be non-overlapping with its analog counterpart. Once the "transition period" is complete several options for OFDM spectrum usage exist— ranging from: using the full, available bandwidth; to moving the OFDM carriers to the center and enhancing robustness against any adjacent channel interference.

4. For both the AM and FM cases, the digital data inherent in the OFDM carriers includes both the primary broadcast information (e.g., music or newscast), and ancillary data that can take a variety of forms and serve as a source of additional revenue for the radio station. This ancillary data offers unique advantages to the DAFPS positioning system according to the present invention.

The key features of the proposed digital radio system, that sets it apart from existing analog, and makes it so appealing to positioning, are as follows:

1. The narrow-bandwidth OFDM carriers are mutually coherent and immediately lend themselves to tone ranging.

2. The spacings of the OFDM carriers offer both ambiguity resolution, based on the close spacing, and fine resolution, based on the end-to-end bandwidth.

3. The highest resolution is offered by the AM carrier, which can be directly tracked.

4. The ancillary data, which is inherent to the AM and FM broadcasts, can provide "calibration" or "correction" information, associated with station-to-station frequency reference offsets and transmit times. In fact, incorporation of a GPS receiver at each radio station, would permit all stations to be mutually synchronized by appropriate information contained within the ancillary data.

5. The integrated applicability of all AM and FM stations provides significant geometric diversity, robustness in signal availability, and commonality in the receiver's OFDM signal processing.

System Architecture and Concept of Operations

Figure 3:
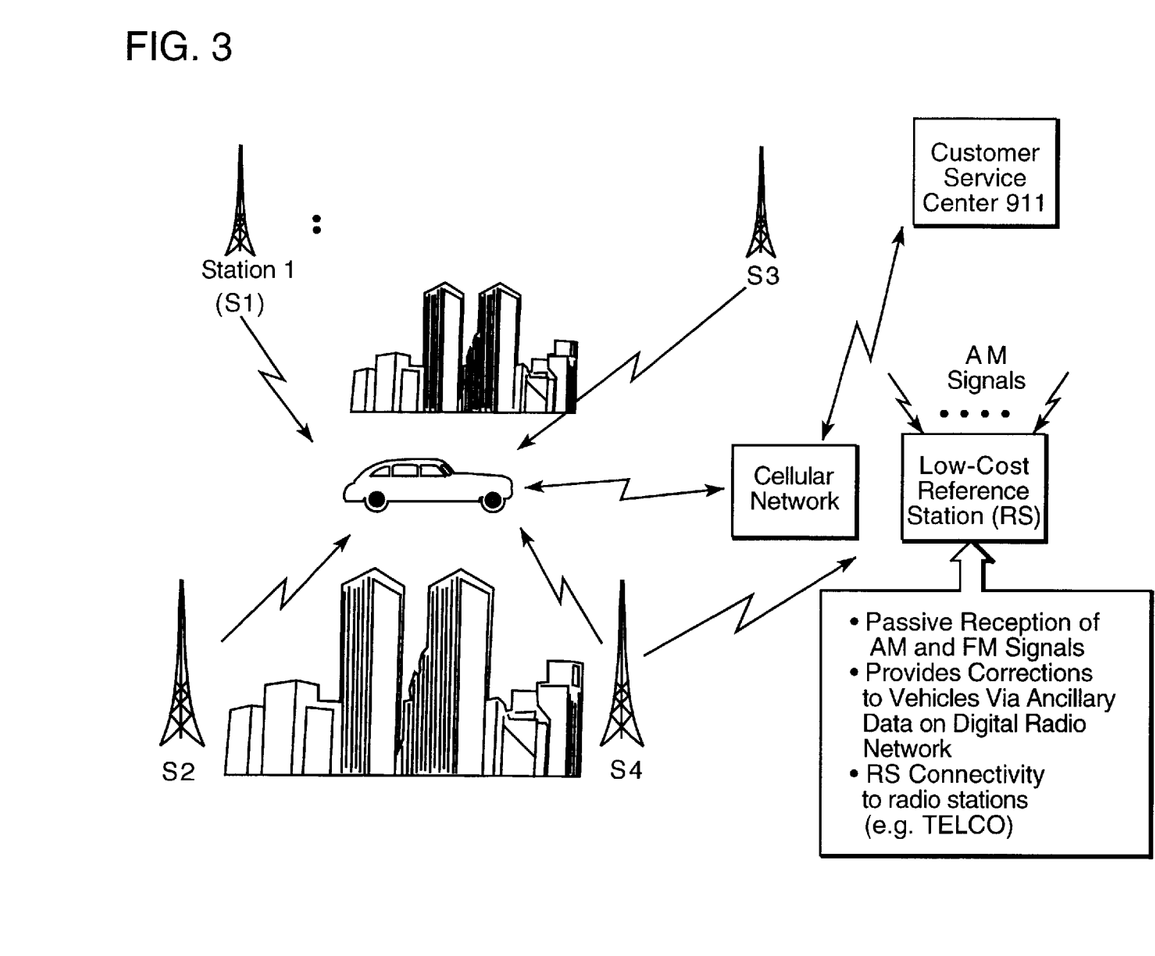
FIG. 3 is a diagram illustrating DAFPS reference System Architecture.
Figure 4:
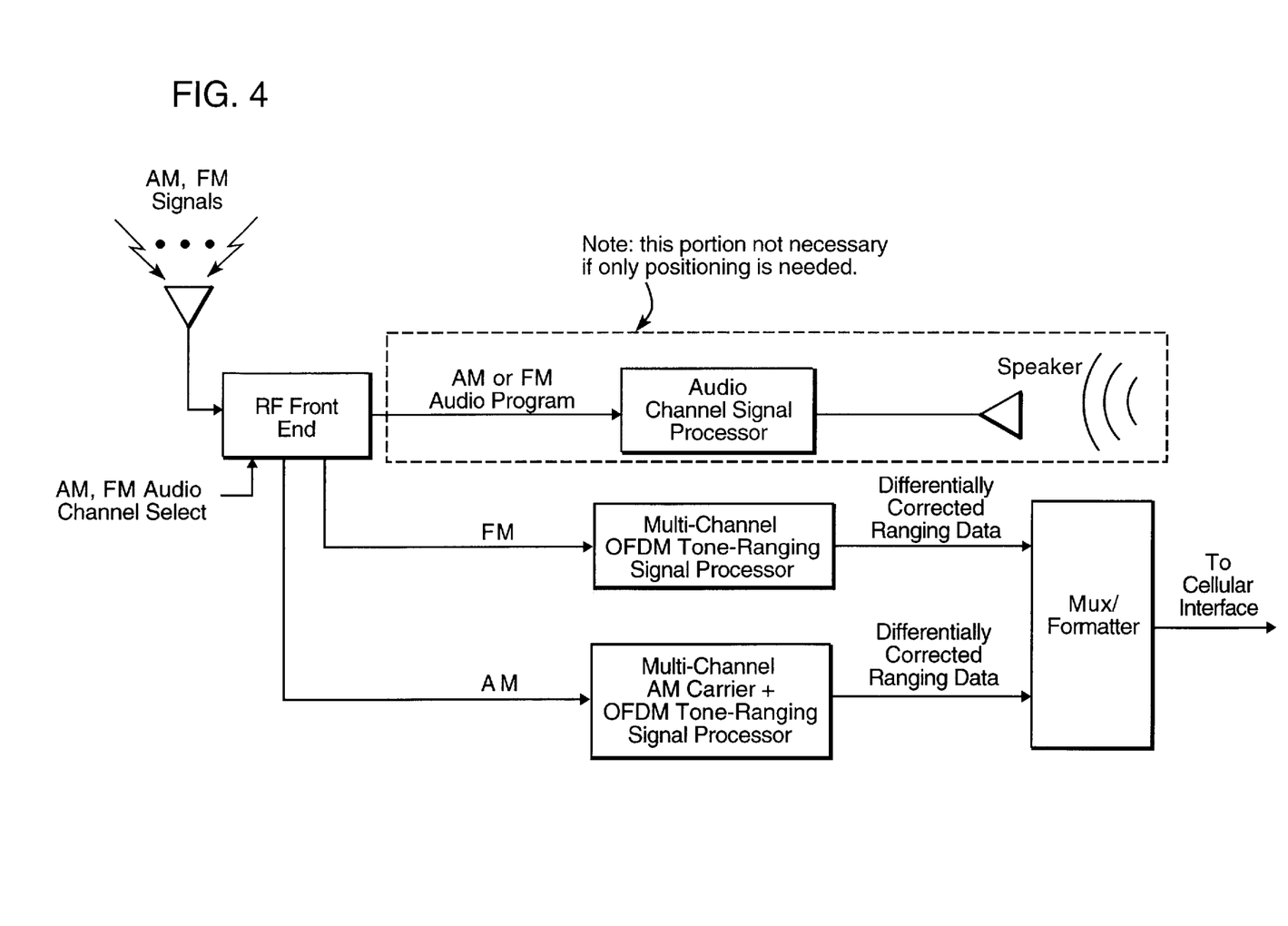
FIG. 4 is a functional block diagram of a radio receiver incorporated into the invention.

A reference architecture description is shown in FIG. 3, and while the user/customer is shown as an automobile, it is important to emphasize that both stationary and mobile users (indoor and outdoor) may be serviced. As seen, a significant number (i.e., 4 or more) of strong AM and/or FM signals are assumed to be simultaneously available; furthermore, these signals can be expected to "surround" the vehicle, thereby yielding excellent signaling geometries for positioning. Within the framework of FIG. 3, and the functional receiver diagram of FIG. 4, the DAFPS concept may be described as follows:

1. The vehicle receives and processes 4 or more AM and/or FM signals and estimates/updates its position at 0.5 second (TBR) intervals. The result is sent to the Customer Service Center (CSC) shown via the Cellular, PCS, or other relevant network, in accordance with the protocol of the service (e.g., E911) under consideration. The details of the position estimation process are described below.

2. The local Reference Station (RS) shown, is at an accurately known location. The RS regularly and passively receives signals from all local AM and FM stations of interest and measures key parameters (e.g., frequency and wavelength variation), that are provided to Customer Service Centers via land lines. The Customer Service Centers then provide AM/FM correction data to each of the AM and FM radio stations for insertion into the ancillary digital data regularly broadcast by that station (e.g., weather, stock quotes). The vehicle then receives these "corrections" as an integral part of the normal demodulation and tracking of the AM or FM OFDM signals that are used for DAFPS. In other words, this invention efficiently leverages a highly self-contained system, and does not depend on an external capability (such as the cellular network) to provide critical correction data.

With proper site selection and utilization of a suitable, low-cost clock reference (e.g., 1 part in $10^{10}$), the RS can be established and maintained very cost-effectively; for example, it does not have to be mounted on an expensive tower. As an option, the RS can also be synchronized to GPS time, so that "correction data" broadcast by the radio stations can also be suitably GPS-time-tagged.

3. As an alternative to the RS concept of item 2, an alternative architecture may be applied, wherein, no RS is employed. Instead, each AM and FM radio transmitter is equipped with a plug-in module that permits local measurement of "correction" data that then feeds directly into the local ancillary digital data stream. One approach for measurement of "correction" data is by using GPS as a common local reference.

Figure 5A:
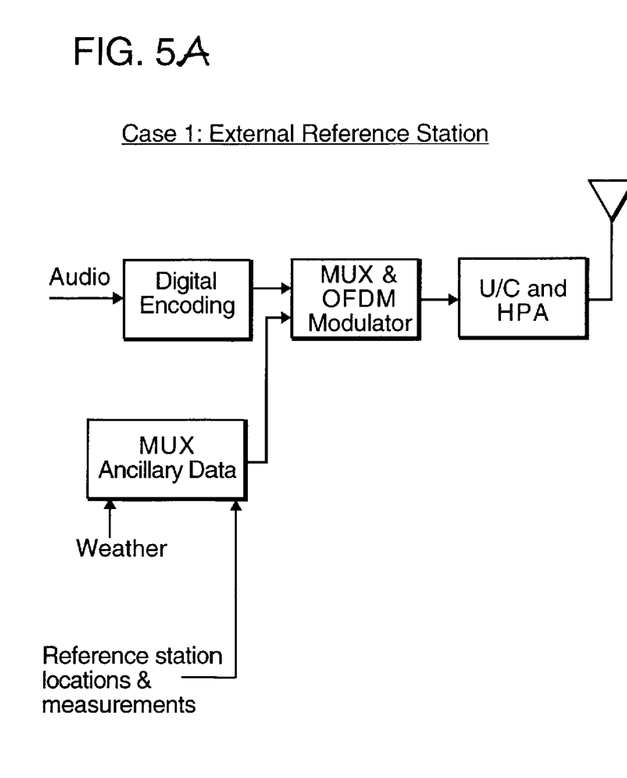
Figure 5B:
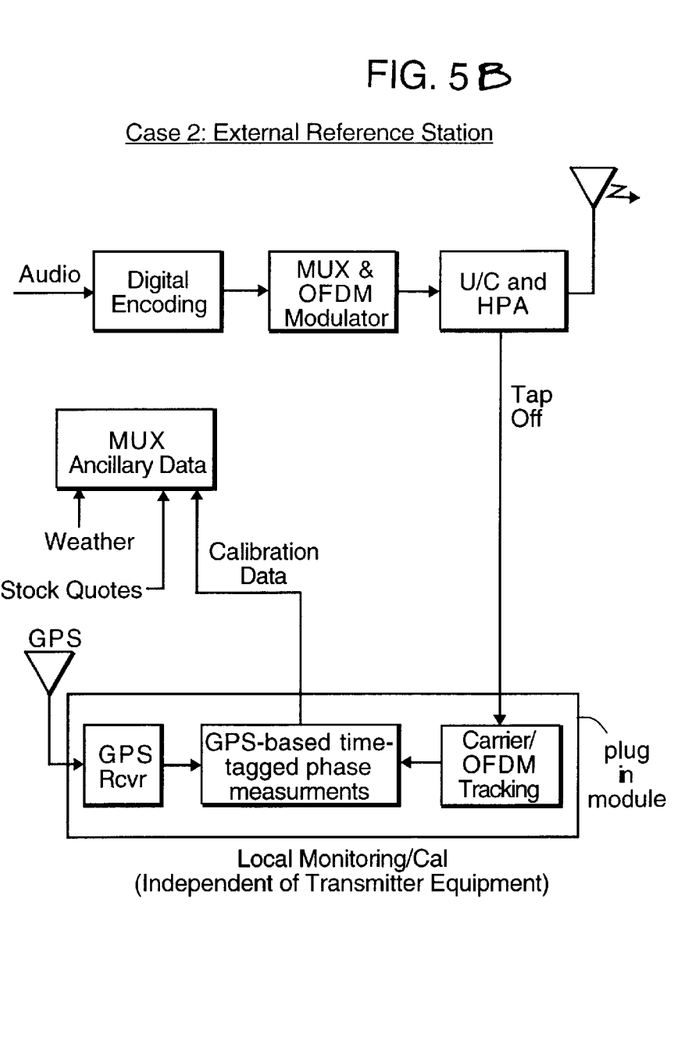

4. FIGS. 5A and 5B illustrate functional description of the radio transmitters for the two options above. FIG. 5A 1 corresponds to item 2, while FIG. 5B illustrates the additional "plug-in" module used for self calibration; here, GPS is used, but alternatives are possible. (Note: the illustration of GPS here is not intended to limit the broadness of this self-calibration feature.)

The radio receiver signal processing, associated with position determination, performs the following steps, at startup:

1. For the geographic area of operation, the receiver has stored an "almanac" of AM and FM stations, including frequencies and locations. If this is not available at startup, the receiver, at startup, scans for a strong AM or FM station. It is assumed here that "almanac" information is available via the ancillary data on all radio stations. Note that the "almanac" is static for a given radius, and does not impose a high overhead on the available ancillary data capacity.

2. Based on "almanac" data, the receiver searches and acquires 4 or more signals—AM or FM. Most desirable is a mix such as 3 AM and 3 FM, with an attractive geometric distribution. The rationale for this is given shortly.

Figure 6:
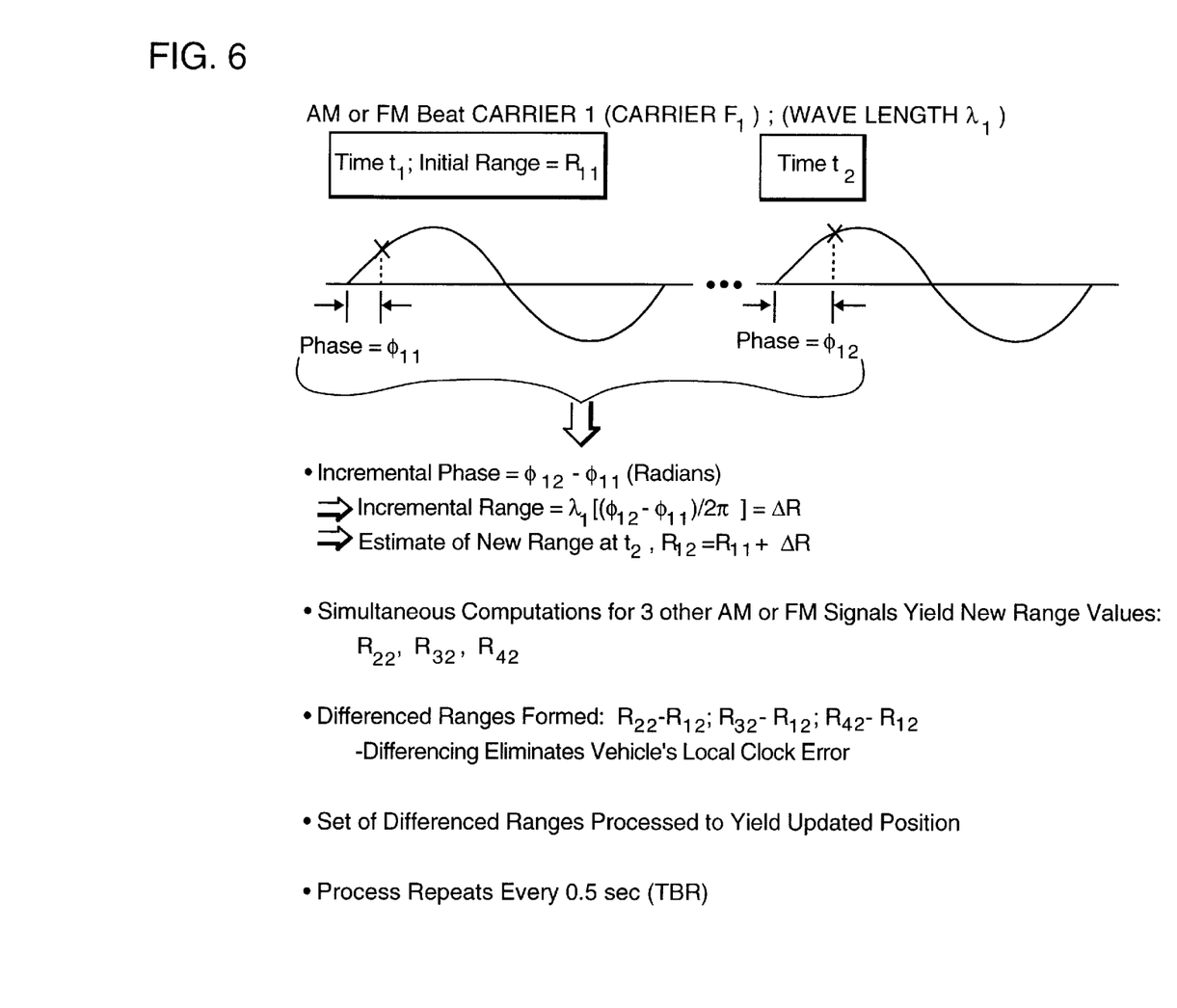

3. Either the AM or FM signals, via the OFDM structure, provides the requisite tone ranging capability as follows (FIG. 6):

a. For each AM or FM signal, one tone is used as a reference. The mixing of this reference with any companion tone provides a "beat tone" of suitable wavelength, and also simultaneously removes any local oscillator reference uncertainty—this process provides a degree of self-calibration.

b. A "near-in" companion tone is used for ambiguity resolution—i.e., the wavelength corresponding to the frequency separation between it and the reference, should exceed the maximum range uncertainty between the user and any radio transmitter. For example, an inter-tone spacing of 1 kHz corresponds to a range of ~200 mi, which should be more than adequate.

c. An "outer" tone is then used to provide a next level of "high" resolution. For example, for the AM scenario of FIG. 2, the 30 kHz spread shown yields a 30 kHz tone for high resolution tracking. The wavelength of this tone is ~6 miles. If one assumes that this tone can be tracked to a resolution of 1 degree RMS, the resulting range resolution would be ~6/180~170 ft. If several such stations could be used, then the resulting position accuracy would be a multiple of this (depending on the geometry). For a multiplier on the order of 3, the resulting accuracy would be ~500 ft.

d. If an "outer", FM tone of FIG. 2 is used, on either side of the central analog FM signal, then a 90 kHz tone can be generated for high resolution tracking. Analogues to the above, this could lead to a range estimate accuracy ~60 ft. If the full 400 kHz spacing could be used, this accuracy could be improved to less than 15 ft.

e. As a final possibility, the unmodulated AM carriers can also be directly tracked (see Schuchman, Weinberg U.S. Pat. No. 5,422,813). This may be very attractive because much of the AM power resides directly in the AM carrier. Thus, for example, for a MHz AM carrier, 1 degree tracking resolution translates into a range estimate accuracy that is less than 7 ft.

4. Once the range estimates are obtained, each is "differently corrected" using the ancillary data embedded in the OFDM digital data itself. This ancillary data contains either Reference Station (RS) corrections, or radio station corrections that are locally generated (FIG. 5).

5. The corrected range estimates are then straight forwardly processed to yield position. Note that a minimum of three stations are required for 2-dimensional position, with more stations providing redundancy and higher accuracy/confidence.

Also important to note is the fact that any combination of AM and FM stations may be used. As can be seen above, tracking of the AM carrier yields the highest resolution, but performance tends to gracefully degrade, depending on the number of AM, FM stations available (e.g., because of location, indoor vs. outdoor, daytime vs. nighttime). In other words, the proposed DAFPS is highly robust.

Furthermore, because of the universality of AM and FM, the proposed DAFPS disclosed herein is available internationally, without the need for any external system, such as GPS. Of course, GPS can always serve as an augmentation, if desired.

Detailed Description of OFDM Positioning Using Data Correlation Technique

Figure 7:
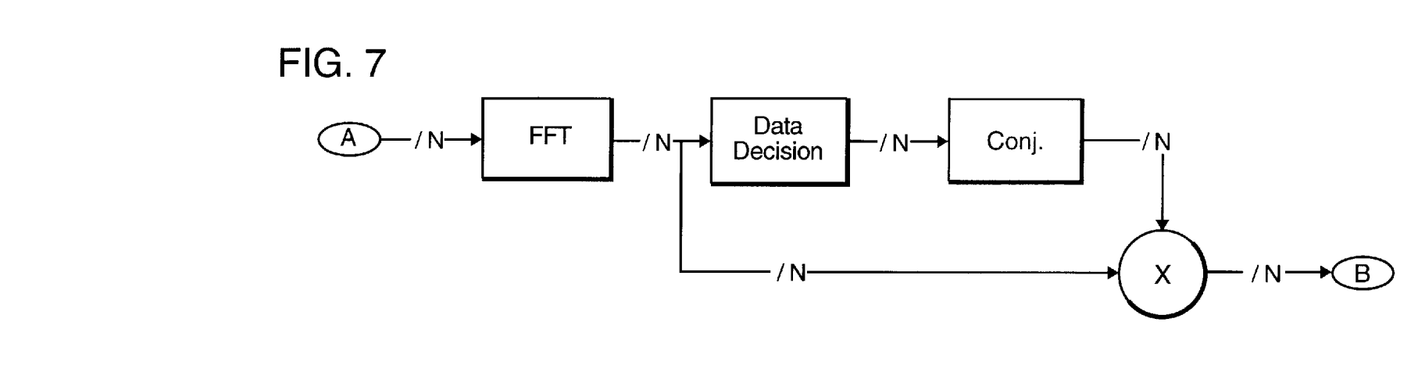
FIG. 7 is a functional block diagram of an alternative ranging system using a circular correlation operation.
Figure 8:
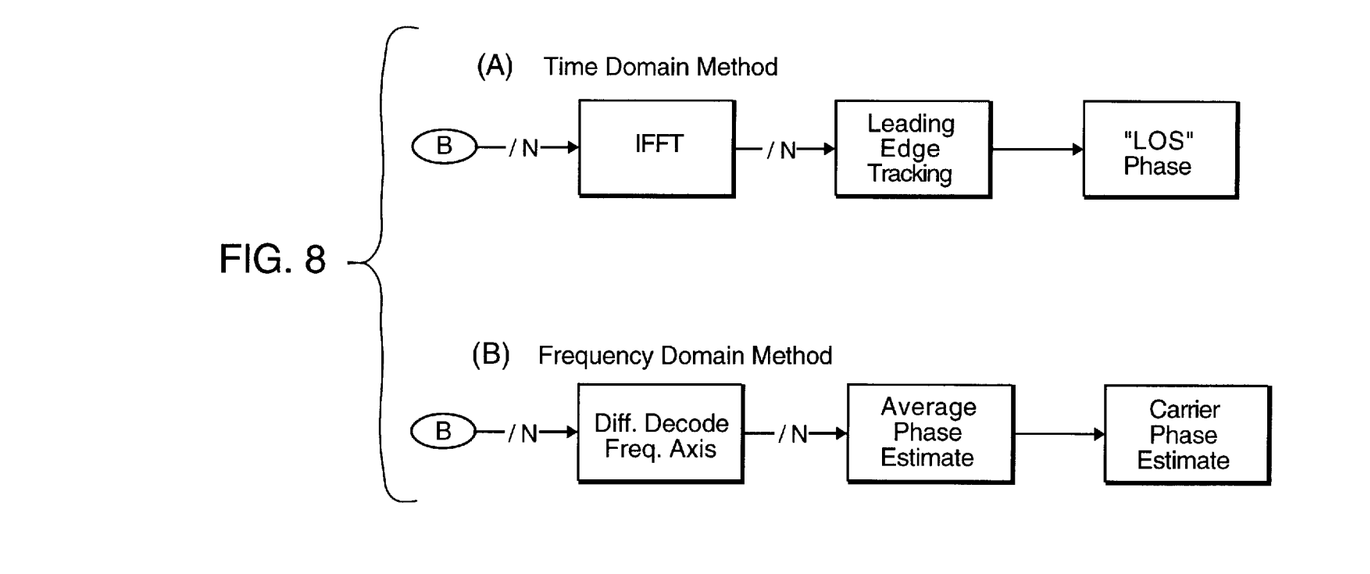
FIGS. 8A and 8B are functional block diagrams of how fine timing resolution can be achieved in time domain (FIG. 8A) or frequency domain (FIG. 8B).

At the receiver, circular-correlation operation is performed in the frequency domain by multiplying the received signal with the complex conjugate of the detected symbols (see FIG. 7). Assuming that receiver has achieved course time synchronization, fine timing resolution can be derived from the resulting CIR in either the time or frequency domain (see FIG. 8). In the time domain the position of the leading edge of the CIR provides a timing offset. This method is performed by taking an IFFT on the CIR signal and detecting the leading edge through a threshold test. In the frequency domain, a time offset results in a phase rotation (i.e., complex tone) proportional) to the delay. Measurement of this delay provides a time offset and can be calculated and performed by a differential decode across the frequency axis (i.e. bins) and taking the average delta phase.

In other positioning systems (e.g., Differential GPS), the phase of the carrier can also be used to further refine the user's position. This type of information can also be obtained with the method. In the time domain, the complex phase of the CIR's leading edge peak can be used. In the frequency domain, if the timing offset (i.e. phase rotation) is removed or tracked out, then the remaining absolute phase is the phase of the carrier. In other words, treating the frequency domain operation as a linear fitting operation, the phase slope and offset are related to the time delay and the absolute carrier phase, respectively.

Also important to note is the fact that any combination of AM and FM stations may be used. As seen above, tracking of the AM carrier yields the highest resolution, but performance tends to gracefully degrade, depending on the number of AM, FM stations available (e.g., because of location, indoor vs. outdoor, daytime vs. nighttime). In other words, the DAFPS disclosed herein is highly robust.

Furthermore, because of the universality of AM and FM, this DAFPS is available internationally, without the need for any external system, such as GPS. Of course, GPS can always serve as an augmentation, if desired.

Detailed Description of OFDM Positioning Using Data Correlation Technique

At the receiver, circular-correlation operation is performed in the frequency domain by multiplying the received signal with the complex conjugate of the detected symbols (See FIG. 7). Assuming that receiver has achieved course time synchronization, fine timing resolution can be derived from the resulting CIR in either the time or frequency domain (see FIG. 8). In the time domain the position of the leading edge of the CIR provides a timing offset. This method is performed by taking an IFFT on the CIR signal and detecting the leading edge through a threshold test. In the frequency domain, a time offset results in a phase rotation (i.e., complex tone) proportional to the delay. Measurement of this delay provides a time offset and can be calculated by performed a differential decode across the frequency axis (i.e. bins) and taking the average delta phase.

In other position system (e.g., Differential GPS), the phase of the carrier can also be used to further refine the user's position. This type of information can also be obtained with the method. In the time domain, the complex phase of the CIR's leading edge peak can be used. In the frequency domain, if the fine timing offset (i.e., phase rotation) is removed or tracked out then the remaining absolute phase is the phase of the carrier. In other words, treating the frequency domain operation as a linear fitting operation, the phase slope and offset are related to the time delay and the absolute carrier phase, respectively.

While the invention has been described in relation to preferred embodiments of the invention, it will be appreciated that other embodiments, adaptations and modifications of the invention will be apparent to those skilled in the art.

What is claimed is:

1. For use in the environment of a plurality of digital AM and FM (AM/FM) radio stations, a digital positioning system using said digital AM and FM radio stations comprising:
   a reference station which regularly and passively receives signals from all local digital AM/FM stations and measures variations in key parameters of frequency and wavelength thereof and provides AM/FM correctional data signals corresponding to each digital AM/FM station frequency and wavelength variation to a a common facility,
   said reference station center being adapted to provide said AM/FM correctional data signals to each of said digital AM/FM radio stations for insertion into ancillary digital data broadcast from each digital AM/FM radio station,
   a plurality of mobile receivers in said environment of digital AM/FM radio stations, each said mobile receiver receiving and processing three or more AM and/or FM signals and estimating and updating its position at periodic intervals and communicating the results thereof to said common facility via cellular or other PCS or digital network in accordance with the emergency protocol service of the receiver.

2. The digital positioning system defined in claim 1 wherein each said digital AM and FM radio station broadcasts on orthogonal frequency division multiplex (OFDM) signal structure.

3. The digital positioning system defined in claim 2 wherein each mobile receiver performs a correlation operation on received OFDM signal.

4. For use in the environment of a plurality of digital AM and FM (AM/FM) radio stations, a digital positioning system using said digital AM and FM radio stations comprising:
   a customer service center,
   a reference station which regularly and passively receives signals from all local AM/FM stations and measures variations in key parameters of frequency and wavelength thereof and provides AM/FM correctional data signals corresponding to each AM/FM station frequency and wavelength variation to said customer service center,
   said customer service center being adapted to provide said AM/FM correctional data signals to each of said AM/FM radio stations for insertion into ancillary digital data broadcast from each AM/FM radio station, a plurality of mobile receivers in said environment of AM/FM radio stations, each said mobile receiver receiving and processing three or more AM and/or FM signals and estimating and updating its position at periodic intervals and sending the results thereof to said customer service center via cellular or other network.

5. The digital positioning system defined in claim 4 wherein each said digital AM and FM radio station broadcasts on orthogonal frequency division multiplex (OFDM) signal structure.

6. The digital positioning system defined in claim 5 wherein each mobile receiver performs a correlation operation on received OFDM signal.

7. A terrestrial positioning system in the environment of a plurality of digital AM and FM radio stations wherein each radio station broadcasts an almanac of digital AM and FM radio stations within a selected area, each said almanac including the frequencies and the locations of said digital AM and FM radio stations in said selected area, respectively, a receiver for receiving said digital AM and FM broadcasts within said selected area, said receiver having a storage device for storing the almanac information for each digital AM and FM radio station within said selected area, a scanner for scanning said digital AM and FM radio stations and selecting a plurality of the strongest of signals from said digital AM and FM radio stations including at least one AM and at least one FM station, and a device for determining the terrestrial position of said receiver by the respective ranges to a predetermined number of said strongest digital AM and FM radio stations.

* * * * *